United States Patent
Kim

(10) Patent No.: US 8,718,893 B1
(45) Date of Patent: May 6, 2014

(54) METHOD AND APPARATUS FOR DETECTING FAILURE OF MOTOR OF ELECTRIC BRAKE BOOSTER FOR VEHICLE

(71) Applicant: Hyundai Mobis Co., Ltd., Seoul (KR)

(72) Inventor: Do Kun Kim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/868,921

(22) Filed: Apr. 23, 2013

(51) Int. Cl.
G06G 7/62 (2006.01)

(52) U.S. Cl.
USPC ............ 701/70; 701/31.9; 701/34.4; 477/182

(58) Field of Classification Search
USPC ........ 701/29.1, 31.9, 34.4, 70, 71, 76, 82, 92; 477/7, 182
See application file for complete search history.

(56) References Cited

U.S. PATENT DOCUMENTS

| | | | |
|---|---|---|---|
| 4,568,131 A * | 2/1986 | Blomberg et al. | 303/115.4 |
| 5,779,326 A * | 7/1998 | Feigel et al. | 303/114.3 |
| 5,855,420 A * | 1/1999 | Lawrence | 303/113.4 |
| 6,758,041 B2 * | 7/2004 | Bishop et al. | 60/545 |
| 7,934,779 B2 * | 5/2011 | Kodama et al. | 303/151 |
| 2008/0275617 A1 * | 11/2008 | Kirmess et al. | 701/76 |
| 2010/0062897 A1 * | 3/2010 | Nishino et al. | 477/29 |
| 2011/0152027 A1 * | 6/2011 | Ohno et al. | 475/150 |
| 2012/0091787 A1 | 4/2012 | Nishino et al. | |

FOREIGN PATENT DOCUMENTS

| | | |
|---|---|---|
| JP | 2008174169 A | 7/2008 |
| KR | 10-0474806 B1 | 3/2005 |
| KR | 10-0707421 B1 | 4/2007 |

* cited by examiner

*Primary Examiner* — Russell Frejd
(74) *Attorney, Agent, or Firm* — Knobbe Martens Olson & Bear LLP

(57) ABSTRACT

Disclosed is a method of detecting a failure of a motor of an electric brake booster. The method includes: a) determining whether the electric vehicle brake booster is in the brake pressure control mode or the motor position control mode; b) storing a first position value of the motor for each of predetermined periods when it is determined that the electric vehicle brake booster is in the brake pressure control mode; c) comparing the first position value stored for the last period among the first position values with a second position value of the motor in the motor position control mode when the brake pressure control mode is changed to the motor position control mode; and d) determining that the motor is in a locked state when the first position value and the second position value are substantially identical.

16 Claims, 4 Drawing Sheets

METHOD AND APPARATUS FOR DETECTING FAILURE OF MOTOR OF ELECTRIC BRAKE BOOSTER FOR VEHICLE

CROSS-REFERENCE TO RELATED APPLICATIONS

This application claims priority to and the benefit of Korean Patent Application No. 10-2012-0140331 filed in the Korean Intellectual Property Office on Dec. 5, 2012, the entire contents of which are incorporated herein by reference.

TECHNICAL FIELD

The present disclosure relates to a method and an apparatus for detecting a failure of a motor of an electric brake booster for a vehicle.

BACKGROUND ART

A booster refers to a device that boosts a pedal effort of a driver, which is transmitted from a brake pedal to a master cylinder. An electric booster refers to a device that interprets a pedal effort of a driver as an electrical signal, drives a motor based on the interpreted electrical signal, and thus produces a brake pressure by pressing the master cylinder. As electric vehicles and hybrid vehicles become prevalent, interest has increased in recent years about the electric booster as a device that is substituted for a hydraulic booster.

A process of producing a brake pressure by the electric booster will be concisely introduced with reference to FIG. 1.

FIG. 1 is a view illustrating a brake system including a typical electric booster.

Referring to FIG. 1, a pedal effort of a driver is transmitted to a sub master cylinder 2 when the driver steps on a pedal 1. A solenoid valve 3 connected to the sub master cylinder 2 forms a hydraulic line P1 from the sub master cylinder 2 to a pedal simulator 4. The pedal simulator 4 provides a reaction force for the pedal 1 to make the driver sense the pedal effort. An oil reservoir 9 is connected to a master cylinder 8.

Meanwhile, a stroke sensor 5 is mounted at the pedal 1 to detect a stroke by a rotational angle of the pedal 1. An ECU 6 recognizes a required brake force of the driver based on the detected stroke, and drives a motor 7 based on the required brake force, and thereby the master cylinder 8 is pressed to produce a brake pressure. Here, the ECU 6 appropriately feedback controls the brake pressure through pressure sensors 10 installed at the sub master cylinder 2 and the master cylinder 8.

In this electric booster, a highly reliable operation of the motor is a very important factor. However, apart from a control error of the motor, a physically locked state of the motor may occur. For example, a locked state in which the motor is not moved may occur due to mechanical or electrical defects of the motor, eccentricity of the motor, damage to a ball screw connected to the motor, or the like. In a case in which the brake pressure is additionally applied in the locked state of the motor, fatal problem with brake safety may occur.

SUMMARY

One aspect of the present invention provides a method and an apparatus for detecting a failure of a motor of an electric brake booster which enhance a fail-safe system and secure brake safety by detecting a locked state of a motor.

An exemplary embodiment of the present invention provides a method of detecting a failure of a motor of an electric vehicle brake booster which selectively performs a brake pressure control mode in a case in which a braking intention of a driver is present, and a motor position control mode in a case in which the braking intention of the driver is not present, the method including: a) determining whether the electric brake booster is in the brake pressure control mode or the motor position control mode; b) storing a first position value of the motor for each predetermined period when it is determined that the electric brake booster is in the brake pressure control mode; c) comparing the first position value stored for the last period among the first position values with a second position value of the motor in the motor position control mode when the brake pressure control mode is changed to the motor position control mode; and d) determining that the motor is in a locked state when the first position value and the second position value are substantially identical.

In step a), it may be determined that the electric brake booster is in the brake pressure control mode when a brake light switch is turned on, a stroke sensor value exceeds a predetermined reference value, and a pressure of a sub master cylinder is substantially greater than zero, and it may be determined that the electric brake booster is in the motor position control mode when the brake light switch is turned off, the stroke sensor value does not exceed the predetermined reference value, and the pressure of the sub master cylinder is equal to or less than zero.

When the stroke sensor value does not exceed the predetermined reference value or the pressure of the sub master cylinder is less than zero in a state in which the brake light switch is turned on, at least one of the brake light switch, a stroke sensor, and a pressure sensor may be determined as failure.

When the stroke sensor value exceeds the predetermined reference value or the pressure of the sub master cylinder is substantially greater than zero in a state in which the brake light switch is turned off, at least one of the brake light switch, a stroke sensor, and a pressure sensor may be determined as failure.

In step b), the first position value may be calculated by detecting a pulse value of an encoder connected to the motor.

In step b), a zero point position of the motor for calculating the first position value may be a position of the motor when the stroke sensor value is the reference value and the pressure of the sub master cylinder is zero.

The method may further include e) warning the driver when it is determined that the motor is in the locked state.

The method may further include f) operating together a vehicle anti-skid system (electronic stability control) in a case in which a pressure of a master cylinder exceeds a predetermined reference value and the first position value stored for the last period exceeds a predetermined reference value after warning the driver.

Another exemplary embodiment of the present invention provides an apparatus for detecting a failure of a motor of a vehicle brake booster which selectively performs a brake pressure control mode in a case in which a braking intention of a driver is present, and a motor position control mode in a case in which the braking intention of the driver is not present, the apparatus including: a brake state determination unit configured to determine whether the vehicle brake booster is in the brake pressure control mode or the motor position control mode; a motor position storage unit connected to the motor and configured to store a first position value of the motor for each predetermined period when it is determined that the vehicle brake booster is in the brake pressure control mode, and to store a position of the motor in the motor position control mode when the brake pressure control mode is changed to the motor position control mode; and a motor locked state determination unit configured to compare the first position value stored for the last period among the first position values with a second position value of the motor in the motor position control mode, and determine that the motor is in a locked state when the first position value and the second position value are substantially identical.

The brake state determination unit may determine that the vehicle brake booster is in the brake pressure control mode when a brake light switch is turned on, a stroke sensor value exceeds a predetermined reference value, and a pressure of a sub master cylinder is substantially greater than zero, and may determine that the vehicle brake booster is in the motor position control mode when the brake light switch is turned off, the stroke sensor value does not exceed the predetermined reference value, and the pressure of the sub master cylinder is equal to or less than zero.

When the stroke sensor value does not exceed the predetermined reference value or the pressure of the sub master cylinder is less than zero in a state in which the brake light switch is turned on, at least one of the brake light switch, a stroke sensor, and a pressure sensor may be determined as failure.

When the stroke sensor value exceeds the predetermined reference value or the pressure of the sub master cylinder is substantially greater than zero in a state in which the brake light switch is turned off, at least one of the brake light switch, a stroke sensor, and a pressure sensor may be determined as failure.

The motor locked state determination unit may calculate the first position value by detecting a pulse value of an encoder connected to the motor.

A zero point position of the motor for calculating the first position value may be a position of the motor when the stroke sensor value is the reference value and the pressure of the sub master cylinder is zero.

The apparatus may further include a warning unit configured to warn the driver when it is determined that the motor is in the locked state.

The apparatus may further include a control unit configured to operate together a vehicle anti-skid system (electronic stability control) in a case in which a pressure of a master cylinder exceeds a predetermined reference value and the first position value stored for the last period exceeds a predetermined reference value.

According to the method of detecting a failure of a motor of an electric vehicle brake booster according to exemplary embodiments of the present invention, the locked state of the motor is detected by comparing the last position of the motor in the brake pressure control mode with a position of the motor in the motor position control mode, in consideration of the fact that the motor surely drives toward a zero point position by a feedback control, and therefore an advantageous effect is provided in that a fail-safe function of a brake system is enhanced and brake safety is increased.

According to the method of detecting a failure of a motor of an electric vehicle brake booster according to exemplary embodiments of the present invention, an advantageous effect is provided in that whether or not a brake light, a stroke sensor, a pressure sensor or the like is determined to have failed may be confirmed in a process of determining a brake state.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
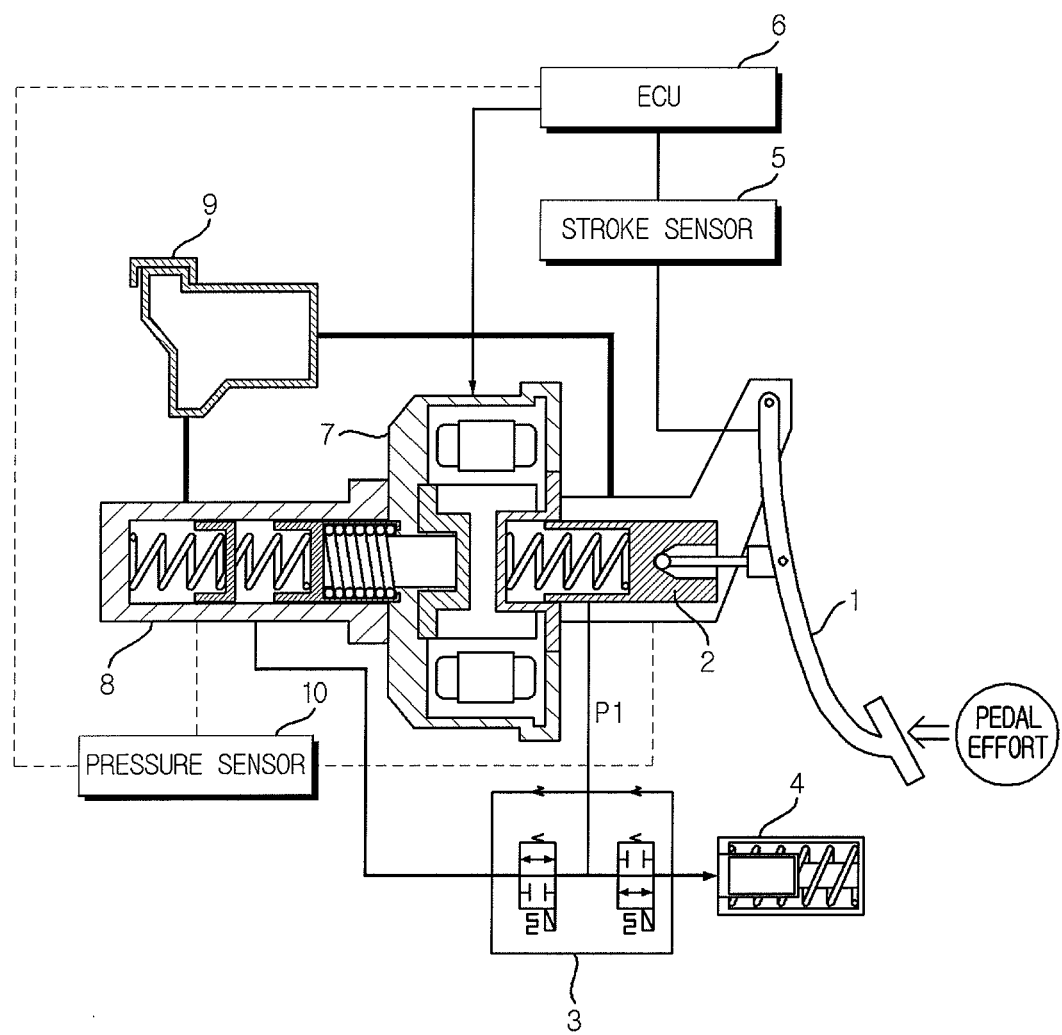
FIG. 1 is a view illustrating a brake system including a typical electric booster.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. It should be understood that although exemplary embodiments of the present invention are described hereafter, the spirit of the present invention is not limited thereto and the present invention may be changed and modified in various ways by those skilled in the art.

The present invention is technically characterized in that a locked state in which the motor is not moved is detected by using a displacement difference of a motor between a brake pressure control mode and a motor position control mode.

Figure 2:
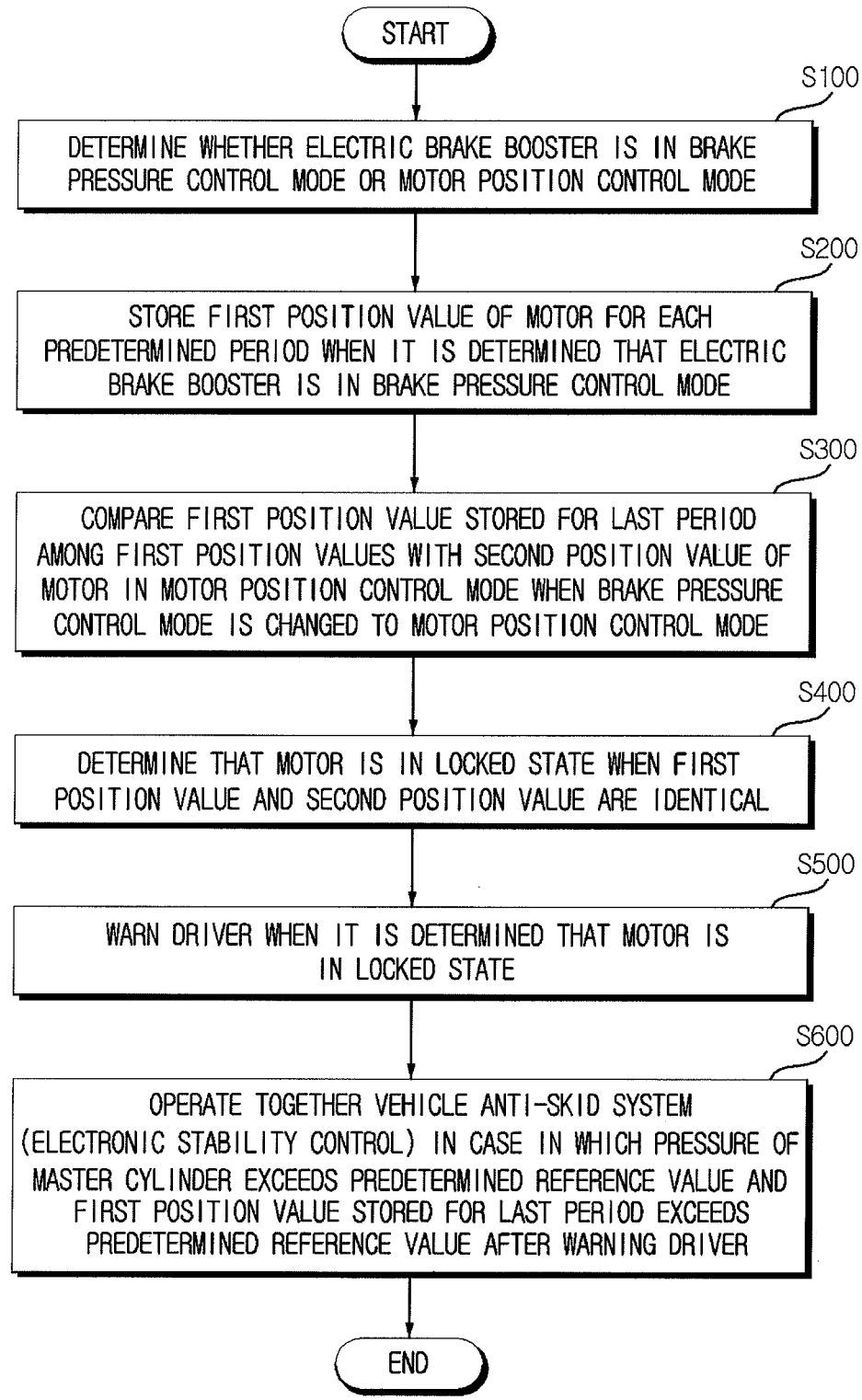
FIG. 2 is a flow chart illustrating a method of detecting a failure of a motor of an electric vehicle brake booster according to an exemplary embodiment of the present invention.
Figure 3:
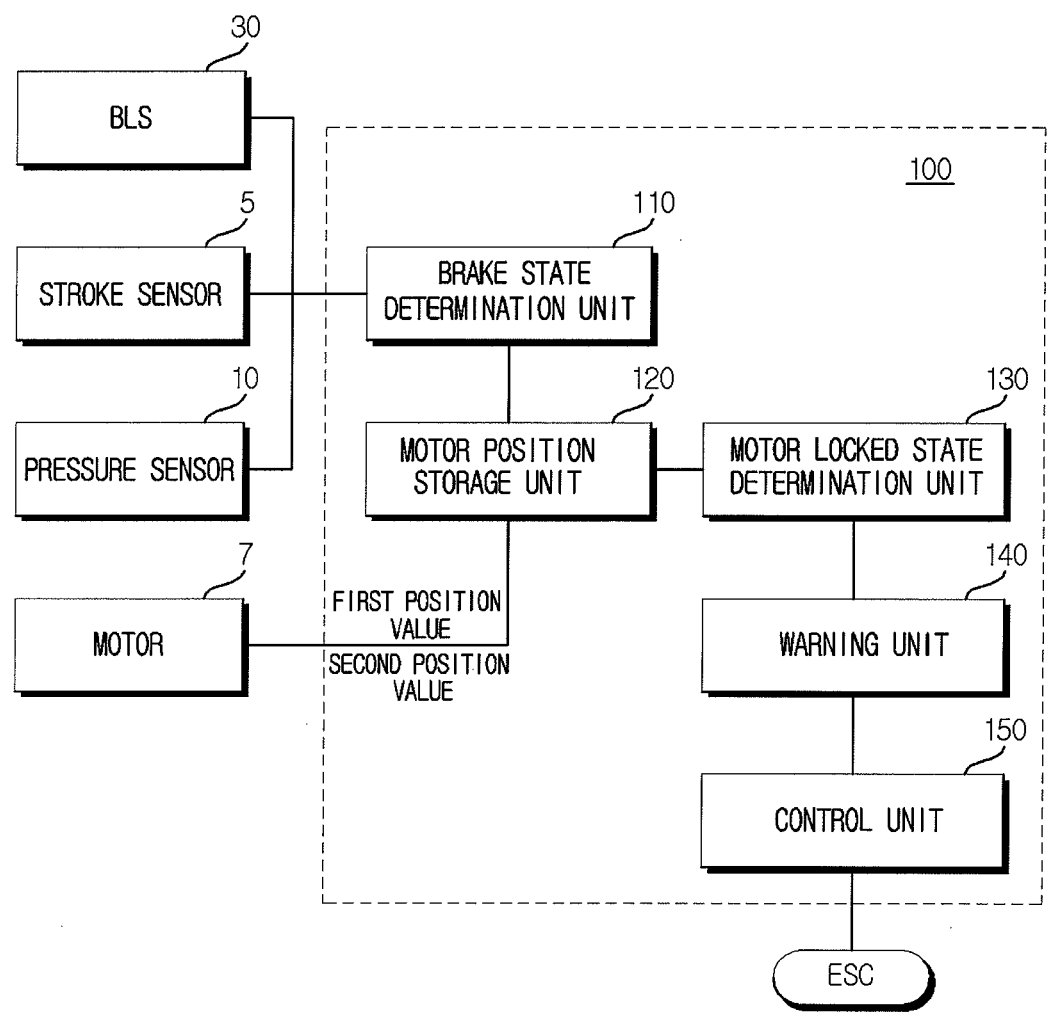
FIG. 3 is a block diagram illustrating an apparatus for detecting a failure of a motor of a vehicle brake booster according to an exemplary embodiment of the present invention.
Figure 4:
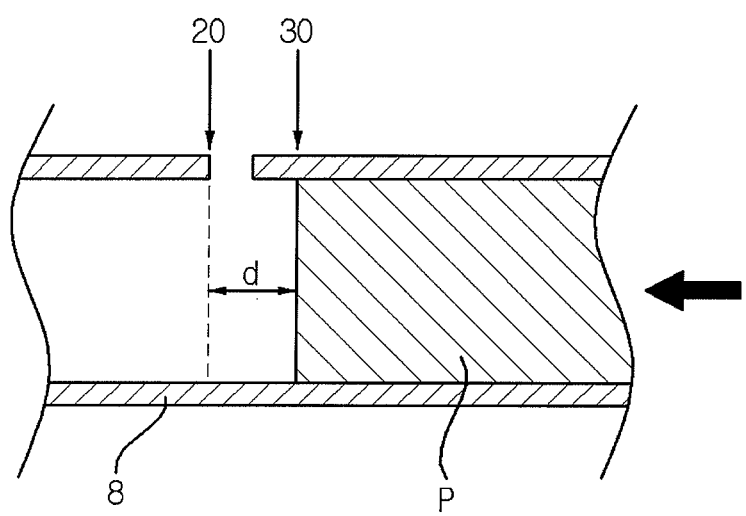
FIG. 4 is a view illustrating a displacement difference of a motor between a brake pressure control mode and a motor position control mode.

FIG. 2 is a flow chart illustrating a method of detecting a failure of a motor of an electric vehicle brake booster according to an exemplary embodiment of the present invention, FIG. 3 is a block diagram illustrating an apparatus for detecting a failure of a motor of a vehicle brake booster according to an exemplary embodiment of the present invention, and FIG. 4 is a view illustrating a displacement difference of a motor between a brake pressure control mode and a motor position control mode.

Referring to FIGS. 2 to 4 together, an apparatus 100 for detecting a failure of a motor, of a vehicle brake booster according to an exemplary embodiment of the present invention includes a brake state determination unit 110, a motor position storage unit 120, a motor locked state determination unit 130, a warning unit 140, and a control unit 150. In a method of detecting a failure of a motor using the apparatus 100 for detecting a failure of a motor, the brake state determination unit 110 determines first whether a state of a brake booster, at present, is a brake pressure control mode or a motor position control mode (S100).

Here, the brake pressure control mode is a mode in which the brake booster feedback controls a motor 7 while checking a pressure of a master cylinder 8 using a pressure sensor 10 until a target brake pressure is reached, in a state in which a driver has stepped on a pedal (1 of FIG. 1) and thus a braking intention of the driver has been confirmed. In the brake pressure control mode, a ball screw connected to the motor 7 moves forward or backward to move a piston (P of FIG. 4) installed in the master cylinder 8.

To determine whether or not the brake booster, at present, is in a state of the brake pressure control mode, the brake state determination unit 110 may check the following three factors. As a first factor, whether or not a brake light switch 30 is in an ON state is checked. As a second factor, whether or not a measured value of a stroke sensor 5 is greater than a predetermined reference value is checked. Here, the reference value may be a stroke sensor value when the driver steps on the pedal 1 with a pedal effort to such an extent that it may be determined that the driver has the braking intention. As a third factor, whether or not a pressure of the sub master cylinder (2 of FIG. 1) measured by the pressure sensor 10 is greater than zero is checked. The brake state determination unit 110 may determine the present state of the brake booster as the brake pressure control mode in a case in which all of the first factor, the second factor, and the third factor are satisfied.

Meanwhile, the motor position control mode is a state in which a driver does not step on the pedal 1, the braking intention of the driver is not confirmed, and the brake booster is on standby to detect the braking intention of the driver. In this motor position control mode, a drive of the motor is controlled so that a position of the piston (P of FIG. 4) is returned to a zero point position. To determine whether or not the brake booster is in the motor position control mode, the brake state determination unit 110 may check the following three factors. As a third factor, whether or not the brake light switch 30 is in an OFF state is checked. As a fourth factor, whether or not a measured value of the stroke sensor 5 is not greater than the predetermined reference value is checked. As a fifth factor, whether or not a pressure of the sub master cylinder (2 of FIG. 1) measured by the pressure sensor 10 is not greater than zero is checked. The brake state determination unit 110 may determine the present state of the brake booster as the motor position control mode in a case in which all of the third factor, the fourth factor, and the fifth factor are satisfied.

However, in a case in which any one or two of the first factor, the second factor, and the third factor are not satisfied, the brake state determination unit 110 may determine that at least one of the brake light switch 30, the stroke sensor 5, and the pressure sensor 10 has failed. For example, when it is checked that the stroke sensor value does not exceed the predetermined reference value or the pressure of the sub master cylinder 2 is less than zero in a state in which the brake light switch 30 is turned on, the brake state determination unit 110 may determine that at least one of the brake light switch 30, the stroke sensor 5, and the pressure sensor 10 has failed. When it is checked that the stroke sensor value exceeds the predetermined reference value or the pressure of the sub master cylinder 2 is greater than zero in a state in which the brake light switch 30 is turned off, at least one of the brake light switch 30, the stroke sensor 5, and the pressure sensor 10 may be determined as failure.

Next, if the aforementioned brake state determination unit 110 determines a state of the brake booster as the brake pressure control mode, the motor position storage unit 120 first stores a first position value of the motor for each predetermined period (S200). In the exemplary embodiment, the motor locked state determination unit 130 detects and counts pulses of an encoder connected to the motor. Because one rotation of the motor may correspond to one pitch of the ball screw connected to the motor, a linear movement distance of the ball screw may be calculated by counting pulses of the encoder and converting the counted value as distance. At this time, the zero point position of the motor may be formed at a point where the stroke sensor value (the reference value) of the pedal 1 is measured when the stroke sensor is initially mounted and the pressure of the sub master cylinder 2 is zero.

Next, if the aforementioned brake state determination unit 110 determines that the brake pressure control mode is changed to the motor position control mode, the motor position storage unit 120 stores a second position value of the motor in the present motor position control mode. The motor locked state determination unit 130 compares the first position value for the last period, which is one of the first position values and is stored immediately before the brake pressure control mode is changed to the motor position control mode, with the second position value, and determines whether or not the first position value and the second position value are substantially identical (S300). The step S300 may be performed whenever the brake pressure control mode is changed to the motor position control mode.

Next, when the first position value and the second position value of the motor are substantially identical, the motor locked state determination unit 130 determines that the motor is in a locked state in which the motor is not moved (S400). Because a feedback control is performed so that the motor is returned to the zero point position when the brake pressure control mode is changed to the motor position control mode, the motor can be assuredly driven. The reason is that the zero point position of the motor in the motor position control mode is set corresponding to a mechanical connection with the pedal 1 and a default value of the stroke sensor.

Therefore, as illustrated in FIG. 4, a displacement difference (d of FIG. 4) is generated between a starting position 20 of the brake pressure control mode and the zero point position 30 of the motor in the motor position control mode, based on an end of the piston P connected to the motor (an arrow direction of FIG. 4 is a pressing direction of the piston). For this reason, the displacement difference d is not generated when the first position value and the second position value of the motor are substantially identical, and thus the drive of the motor does not occur even though the brake pressure control mode is changed to the motor position control mode. This means that the motor is in a locked state.

Next, when the motor locked state determination unit 130 determines that the motor is in the locked state, the warning unit 140 warns the driver about this (S500).

Next, after warning the driver, the control unit 150 may perform a fail-safe process (S600). In the exemplary embodiment, when the pressure of the master cylinder exceeds a predetermined reference value and the first position value stored for the last period of the brake pressure control mode exceeds a predetermined reference value, the control unit 150 may control so as for a vehicle anti-skid system (electronic stability control) to be operated together. For example, when the brake is not released because of a high residual pressure of the master cylinder, the control unit 150 may request the vehicle anti-skid system to reduce the residual pressure of the master cylinder through an accumulator.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present subject matter will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of detecting a failure of a motor of an electric vehicle brake booster which selectively performs a brake pressure control mode in a case in which a braking intention of a driver is present, and a motor position control mode in a case in which the braking intention of the driver is not present, the method comprising:
   a) determining whether the electric vehicle brake booster is in the brake pressure control mode or the motor position control mode;
   b) storing a first position value of the motor for each of predetermined periods when it is determined that the electric vehicle brake booster is in the brake pressure control mode;
   c) comparing the first position value stored for the last period among the first position values with a second position value of the motor in the motor position control mode when the mode is changed from the brake pressure control mode to the motor position control mode; and
   d) determining that the motor is in a locked state when the first position value and the second position value are substantially identical.

2. The method of claim 1, wherein, in step a), it is determined that the electric vehicle brake booster is in the brake pressure control mode when a brake light switch is turned on, a stroke sensor value exceeds a predetermined reference value, and a pressure of a sub master cylinder is substantially greater than zero, and it is determined that the electric vehicle brake booster is in the motor position control mode when the brake light switch is turned off, the stroke sensor value does not exceed the predetermined reference value, and the pressure of the sub master cylinder is less than zero.

3. The method of claim 2, wherein when the stroke sensor value does not exceed the predetermined reference value or the pressure of the sub master cylinder is less than zero in a state in which the brake light switch is turned on, at least one of the brake light switch, a stroke sensor, and a pressure sensor is determined as failure.

4. The method of claim 2, wherein when the stroke sensor value exceeds the predetermined reference value or the pressure of the sub master cylinder is substantially greater than zero in a state in which the brake light switch is turned off, at least one of the brake light switch, a stroke sensor, and a pressure sensor is determined as failure.

5. The method of claim 1, wherein, in step b), the first position value is determined by detecting pulses of an encoder connected to the motor.

6. The method of claim 5, wherein, in step b), a zero point position of the motor for determining the first position value is a position of the motor when the stroke sensor value is the reference value and the pressure of the sub master cylinder is zero.

7. The method of claim 1, further comprising e) warning the driver when it is determined that the motor is in the locked state.

8. The method of claim 7, further comprising f) operating a vehicle anti-skid system (electronic stability control) in a case in which a pressure of a master cylinder exceeds a predetermined reference value and the first position value stored for the last period exceeds a predetermined reference value after warning the driver.

9. An apparatus for detecting a failure of a motor of a vehicle brake booster which is configured to selectively performs a brake pressure control mode in a case in which a braking intention of a driver is present, and a motor position control mode in a case in which the braking intention of the driver is not present, the apparatus comprising:
   a brake state determination unit configured to determine whether the vehicle brake booster is in the brake pressure control mode or the motor position control mode;
   a motor position storage unit connected to the motor and configured to store a first position value of the motor for each of predetermined periods when it is determined that the vehicle brake booster is in the brake pressure control mode, and to store a position of the motor in the motor position control mode when the mode is changed from the brake pressure control mode to the motor position control mode; and
   a motor locked state determination unit configured to compare the first position value stored for the last period among the first position values with a second position value of the motor in the motor position control mode, and determine that the motor is in a locked state when the first position value and the second position value are substantially identical.

10. The apparatus of claim 9, wherein the brake state determination unit is configured to determine that the vehicle brake booster is in the brake pressure control mode when a brake light switch is turned on, a stroke sensor value exceeds a predetermined reference value, and a pressure of a sub master cylinder is substantially greater than zero, and is further configured to determine that the vehicle brake booster is in the motor position control mode when the brake light switch is turned off, the stroke sensor value does not exceed the predetermined reference value, and the pressure of the sub master cylinder is less than zero.

11. The apparatus of claim 10, wherein when the stroke sensor value does not exceed the predetermined reference value or the pressure of the sub master cylinder is less than zero in a state in which the brake light switch is turned on, at least one of the brake light switch, a stroke sensor, and a pressure sensor is determined as failure.

12. The apparatus of claim 10, wherein when the stroke sensor value exceeds the predetermined reference value or the pressure of the sub master cylinder is substantially greater than zero in a state in which the brake light switch is turned off, at least one of the brake light switch, a stroke sensor, and a pressure sensor is determined as failure.

13. The apparatus of claim 9, wherein the motor locked state determination unit is configured to determine the first position value by detecting pulses of an encoder connected to the motor.

14. The apparatus of claim 13, wherein a zero point position of the motor for determining the first position value is a position of the motor when the stroke sensor value is the reference value and the pressure of the sub master cylinder is zero.

15. The apparatus of claim 9, further comprising a warning unit configured to warn the driver when it is determined that the motor is in the locked state.

16. The apparatus of claim 15, further comprising a control unit configured to operate a vehicle anti-skid system (electronic stability control) in a case in which a pressure of a master cylinder exceeds a predetermined reference value and the first position value stored for the last period exceeds a predetermined reference value.

\* \* \* \* \*